US007887028B2

(12) United States Patent
Reid

(10) Patent No.: US 7,887,028 B2
(45) Date of Patent: Feb. 15, 2011

(54) ELECTRIC FENCE

(75) Inventor: Paul Clifford Reid, Hamilton (NZ)

(73) Assignee: Gallagher Group Limited, Hamilton (NZ)

( * ) Notice: Subject to any disclaimer, the term of this patent is extended or adjusted under 35 U.S.C. 154(b) by 56 days.

(21) Appl. No.: 10/489,324

(22) PCT Filed: Sep. 18, 2002

(86) PCT No.: PCT/NZ02/00183

§ 371 (c)(1),
(2), (4) Date: Oct. 27, 2004

(87) PCT Pub. No.: WO03/024205

PCT Pub. Date: Mar. 27, 2003

(65) Prior Publication Data

US 2005/0041363 A1 Feb. 24, 2005

(30) Foreign Application Priority Data

Sep. 18, 2001 (NZ) ..................................... 513316

(51) Int. Cl.
*A01K 3/00* (2006.01)

(52) U.S. Cl. .......................................... 256/10; 256/37

(58) Field of Classification Search ................... 256/10, 256/37, 40–44; 174/158 F, 168; D8/359; 43/112; 49/59
See application file for complete search history.

(56) References Cited

U.S. PATENT DOCUMENTS 422,494 A * 3/1890 Bissel ......................... 256/41
735,026 A * 7/1903 Barnes ......................... 256/40
1,128,095 A * 2/1915 Bennett ......................... 256/40
1,483,005 A * 2/1924 McNair ......................... 256/10
1,848,625 A * 3/1932 Hager ......................... 43/112
2,018,532 A * 10/1935 Pittman ................... 174/158 F
2,244,191 A * 6/1941 Evans ......................... 43/112
2,278,538 A * 4/1942 Dubilier ......................... 43/112
2,311,779 A * 2/1943 Schilling ................. 174/158 F
2,350,290 A * 5/1944 Moore ......................... 256/10
2,437,613 A * 3/1948 Redpath ......................... 256/10
2,475,181 A * 7/1949 Gardenhour ................. 43/112
2,512,740 A * 6/1950 Evans ......................... 256/10
2,533,621 A * 12/1950 Pratt et al. ..................... 256/10
2,546,429 A * 3/1951 Carr ............................ 256/10
2,633,337 A * 3/1953 Nieuwenhuis ............... 256/10

(Continued)

FOREIGN PATENT DOCUMENTS

BE 1013259 A6 11/2001

(Continued)

*Primary Examiner*—Victor Macarthur
(74) *Attorney, Agent, or Firm*—Nixon Peabody LLP

(57) ABSTRACT

An electric fence to span a given region between two substantially opposing supports, the fence including one or more insulators coupled to each opposing support; an electrical power source electrically connected to a first conductive strand and configured to apply an electrical current thereto, at least one further electrically distinct conductive strand coupled to the insulators and at a different electric potential than the first strand, characterised in that at least one insulator includes a substantially non-conductive element having one or more confined pathways, the element rotatable about a central axis orientated to maintain symmetrical revolution and wherein the conductive strands extend continuously and repeatedly between each support, each conductive strand in contact with at least one of the insulators.

15 Claims, 8 Drawing Sheets

U.S. PATENT DOCUMENTS

| | | | | | |
|---|---|---|---|---|---|
| 2,650,263 | A | * | 8/1953 | Steinmayer | 174/161 R |
| 2,740,827 | A | * | 4/1956 | Smalley | 174/162 |
| 2,794,061 | A | * | 5/1957 | Kempff | 256/10 |
| 2,897,629 | A | * | 8/1959 | Jesman | 43/112 |
| 3,071,640 | A | * | 1/1963 | Langlie et al. | 174/158 F |
| 3,473,251 | A | * | 10/1969 | Kahn | 43/112 |
| 3,504,892 | A | * | 4/1970 | Crist | 256/10 |
| 4,298,185 | A | * | 11/1981 | Janssen | 256/41 |
| 4,318,088 | A | * | 3/1982 | Hunter | 256/10 |
| 4,676,485 | A | * | 6/1987 | Ciordinik et al. | 256/12 |
| 4,829,287 | A | * | 5/1989 | Kerr et al. | |
| 5,369,909 | A | * | 12/1994 | Murphy | 43/112 |
| 5,412,158 | A | * | 5/1995 | Yearwood | 174/158 F |
| 5,738,341 | A | * | 4/1998 | Lease | 256/10 |
| 6,036,175 | A | * | 3/2000 | Harper | 256/10 |
| 6,209,853 | B1 | * | 4/2001 | Roy et al. | 256/10 |
| 6,343,778 | B1 | * | 2/2002 | Brown | 256/10 |
| 6,469,636 | B1 | * | 10/2002 | Baird et al. | |
| 6,646,551 | B2 | * | 11/2003 | Perry | 256/10 |
| 6,712,339 | B1 | * | 3/2004 | Smith | 256/10 |

FOREIGN PATENT DOCUMENTS

| | | | | |
|---|---|---|---|---|
| DE | 367270 | | * | 1/1923 |
| DE | 19833860 | A1 | * | 2/2000 |
| EP | 169763 | A1 | * | 1/1986 |
| FR | 2191828 | A | * | 2/1974 |
| GB | 350519 | | * | 6/1931 |
| GB | 1395151 | A | * | 5/1975 |
| GB | 1 604 155 | | | 12/1981 |
| GB | 2337147 | A | * | 11/1999 |
| GB | 2399828 | A | * | 9/2004 |
| JP | 11149836 | A | * | 6/1999 |
| NL | 8902214 | A | * | 4/1991 |
| WO | 96/13817 | | | 5/1996 |
| WO | 01/88313 | A2 | | 11/2001 |

* cited by examiner

ELECTRIC FENCE

CROSS-REFERENCE TO RELATED APPLICATION

This application claims priority based on International Patent Application No. PCT/NZ02/00183, entitled "Electric Fence" by Paul Clifford Reid, which claims priority of New Zealand Application No. 513316, filed on Sep. 18, 2001.

TECHNICAL FIELD

The present invention relates generally to a means of producing an electric fence and to the insulators used therein.

BACKGROUND ART

Electric fences are employed for both security purposes and for stock control in countries worldwide. Despite the proliferation of such electrified fences, the basic means of construction and operation are fundamentally the same, whereby a fence used to prevent movement through a given area is normally formed by a plurality of individual spaced apart (typically parallel) electrified wires/strands extending across the said space (either vertically or horizontally). In order to maintain the appropriate electrical connections, a common connector is attached across the individual wires to provide power to each electrified element.

Typically on longer sections this system requires each individual electrified wire to be individually tensioned, to provide both physical and electrical barrier properties, and to be securely affixed and insulated from the end post upon which all the said electrified strands are terminated. This is both time consuming and expensive and requires a certain degree of skill to ensure correct installation. Furthermore, to achieve the above mentioned tension required for each individual electrified element, typical known systems hard-wire the electrified element to an insulator at one end of the fence enclosure and use a ratchet mechanism at the other end to provide the said tension. This system requires an individual ratchet mechanism for each electrified strand/wire.

It would be clearly advantageous therefore to form an electrified fence from a reduced number of electrified strands, associated insulators, and ratchet/tensioning mechanisms.

In most security applications and some stock control fences, a separate earth or low voltage strand is employed in addition to the high voltage strand. This ensures a potential difference between an individual or stock contacting the two strands.

On fences with shorter sections formed with wires of different potential (e.g. where one wire acts as an earth, or low voltage potential wire and the other as a phase wire, or high voltage potential wire), it is known to use continuous strands of wire alternating between opposing supports of a fence. However, each strand is effectively tied off at each insulator by applying a number of turns of the wire around the insulators at either support.

As the phase and earth wires (for example) typically form alternate spans between the supports of the fence, some means is required to avoid a short-circuit as the strands cross each other at the supports of the fence. In the prior art, this is achieved by bending an earth wire outwards from the plane of the fence between two insulators on the same side of the fence, looping over the intermediate insulator carrying the other wire of different voltage potential.

The same procedure is adopted for the other wire, though with the looped section of the wire being bent outwards from the plane of the fence in the opposite direction to the first wire to avoid shorting/interference.

However, this configuration produces numerous drawbacks including:

- difficulties in tensioning/re-tensioning individual spans after the fence is constructed;
- the vulnerability of the projecting looping sections of wire to being snagged and/or damaged by passing vehicles/people/animals;
- an aesthetically undesirable appearance; and
- difficulties in concealing which wire is the low voltage/earth strand.

It is possible for an assailant to scale an electric security fence by only holding the successive earth strands spanning the gate/fence.

Therefore, it is desirable to make it difficult for an assailant to visibly discern the live strand from the earth strand.

Known means of accomplishing this for fences utilising multiple individual strands joined by configuring wires include the use of complex fittings that clamp several live and earth strands in a manner that obscures the electrical continuity of each strand. Such fittings are however difficult to implement and service and expensive to make.

The same principles apply to fences using variants of the high voltage—earth strand combination. Such variants include applying different high voltage potentials to both strands, or offsetting the instance of the high-voltage pulses, as described in European Patent No. 0843954, U.S. Pat. No. 5,973,413, Australian Patent No. 705977 and South African Patent No. 96/6799 stemming from the applicant's patent PCT/NZ0096/00081, incorporated herein by reference.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided an electric fence to span a given region between a first and a second substantially opposing supports, said fence including: one or more insulators coupled to each said opposing support; a first conductive strand coupled to the insulators and connected to an electrical power source configured to apply an electrical current to said first strand; at least one further conductive strand coupled to said insulators, electrically distinct, and at a different electric potential to said first conductive strand, and characterised in that at least one said insulator includes a substantially non-conductive element having one or more confined pathways, the element rotatable about a central axis orientated to maintain symmetrical revolution and wherein said conductive strands extend continuously and repeatedly between each said opposing support, each conductive strand in contact with at least one of the insulators. Preferably the substantially non-conductive element of the, or each, insulator has at least two confined pathways, each strand of the at least two conductive strands passing through separate pathways of the, or each, insulator.

Preferably the conductive strands having the electrical potential difference therebetween are in contact with at least one common insulator.

Thus, where two conductive strands pass around or through a single insulator in close physical proximity, it is not obvious to an observer/assailant which strand is which. It would thus be difficult to determine for example which strand entering or exiting the insulator is the continuation of the high voltage strand.

The electrical potential difference between the two or more conductive strands may, according to different embodiments, be created by differences in at least one of voltage phase, magnitude and/or polarity.

Thus, provided there is a relative electrical potential difference between any two strands, an assailant attempting to scale the fence by holding both strands will still receive a shock.

To make it even more difficult to determine which strand may be safe to grasp, the high voltage and low (or earthed) voltage applied to two strands may be periodically reversed. Offset synchronised high voltage pulses applied to both strands may also be utilised to achieve the same effect.

The term ‘fence’ includes any structure formed to provide a barrier between defined limits, including doors, panels, gates, walls and so forth.

Preferably, each strand is in contact with a said insulator via a said confined pathway, physically and electrically separate from any other conductive strands.

Preferably, said confined pathway may be formed in an insulator as at least one or more of: a groove, a channel, a notch, a passageway, an aperture or the like.

According to one embodiment, said non-conductive elements are substantially disk-shaped with a substantially circular cross section. Preferably, the disk-shaped element is rotatable about a central axis orientated to maintain symmetrical revolution.

According to an alternative embodiment, one or more said insulators each include two or more said non-conductive elements, with each said central axis being substantially co-axial with that of the other non-conductive elements forming the insulator. Preferably, said non-conductive element is provided with one or more confined pathways in the form of grooves about an outer curved surface thereof, concentric with said central axis.

Preferably, said grooves are configured with side walls sufficiently deep to obscure from an observer on either side of the fence at least part of the path of a strand in contact with the non-conductive element.

Preferably, one end of each conductive strand is fixedly mounted, whilst the other end is coupled to an insulator provided with a tensioning mechanism. Preferably, said tensioning mechanism is comprised of said non-conductive rotatable element provided with a series of ratchet teeth and a pawl configured to only permit unidirectional rotation of said rotatable element.

Preferably, at least one of said grooves contains said ratchet teeth.

Preferably, said rotatable element is rotatably attached to a non-conductive bracket.

Preferably, said pawl is releasably attached to said non-conductive bracket.

Preferably, said electric fence is tensioned by winding said conductive strands about the outside of said disk-shaped element rotated in said unidirectional rotation allowed by said ratchet and pawl arrangement.

It will be appreciated that the electric fence may form a variety of configurations dependent on the particular requirements of the environment and/or security threat. Indeed, the present invention need not be restricted solely to security applications and may be equally applicable to animal stock control fences and so forth.

It will also be appreciated that dependent on the lateral spacing required between traversing strands, it would be possible to use either a single insulator as a turning piece to allow the longitudinal axis of a conductive strand to be turned through substantially 180° or to use two spaced apart insulators located on the same side of said region used in combination to turn a conductive strand through substantially 180°.

It will be appreciated that each insulator’s non-conductive element need not be rotatable although if configured so, the force required to tension the fence will be attenuated and the stresses imposed on all the non-conductive elements and respective mounting brackets involved reduced.

In the event the given region requiring protection does not permit a direct ‘straight line’ passage between said first and second supports of the fence, intermediate insulators may be provided between the supports of the fence and the conductive strands coupled thereto to provide apices between angled individual sections of the conductive strand traversing the region.

Clearly, only the end insulator requires the inclusion of the pawl attachment in order to facilitate the ratchet operation whilst tensioning the fence. Therefore, in order to reduce costs of the entire fence, the remaining insulators may be provided with out the detachable pawl attachment. Each rotatable element would nevertheless be provided with the ratchet teeth to aid inter-changeability and due to the minimal increase in manufacturing costs.

The present invention also includes the fence produced by the above described methods.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
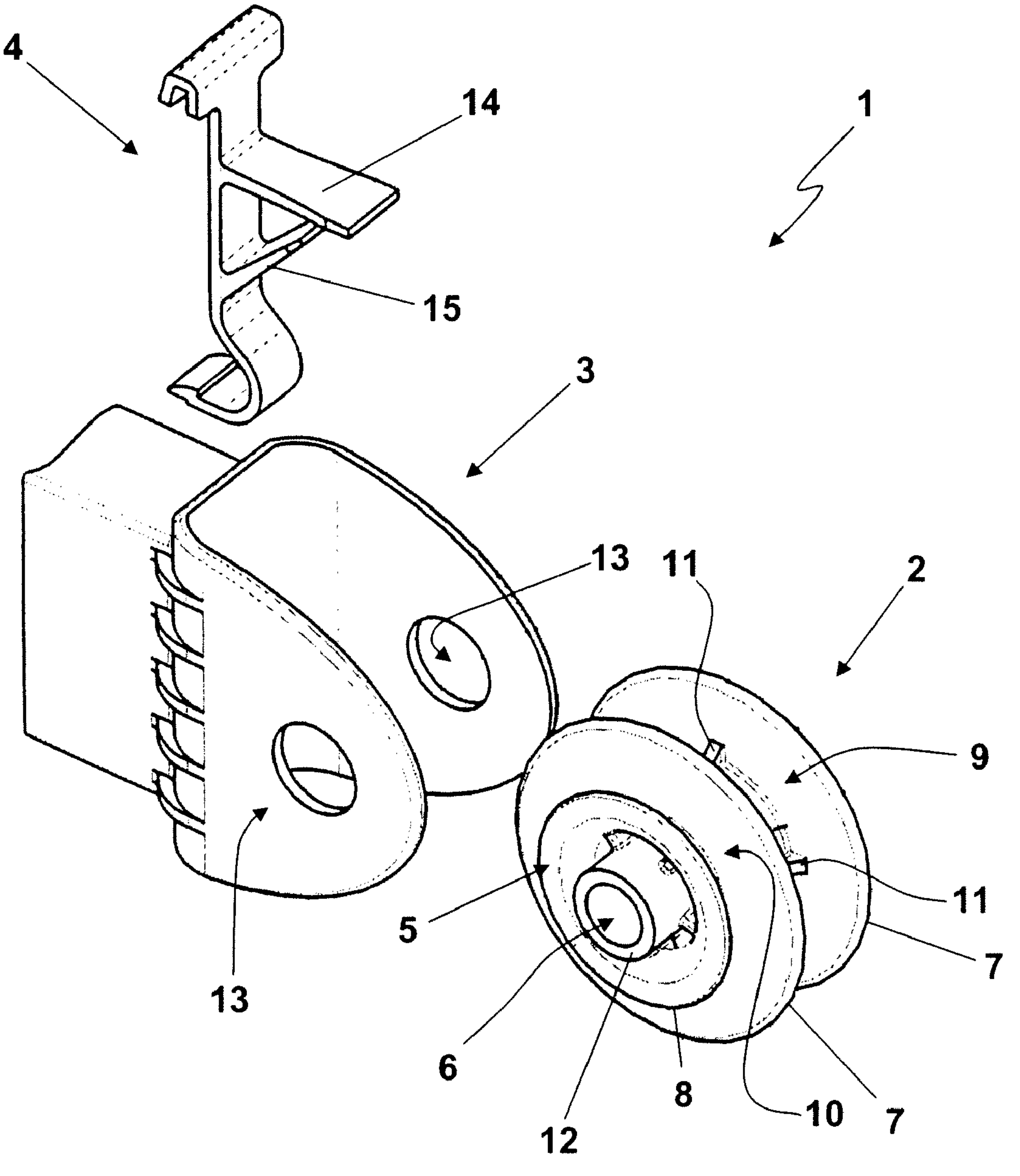
FIG. 1 shows an exploded perspective view of an insulator assembly of a preferred embodiment of the present invention.
Figure 2:
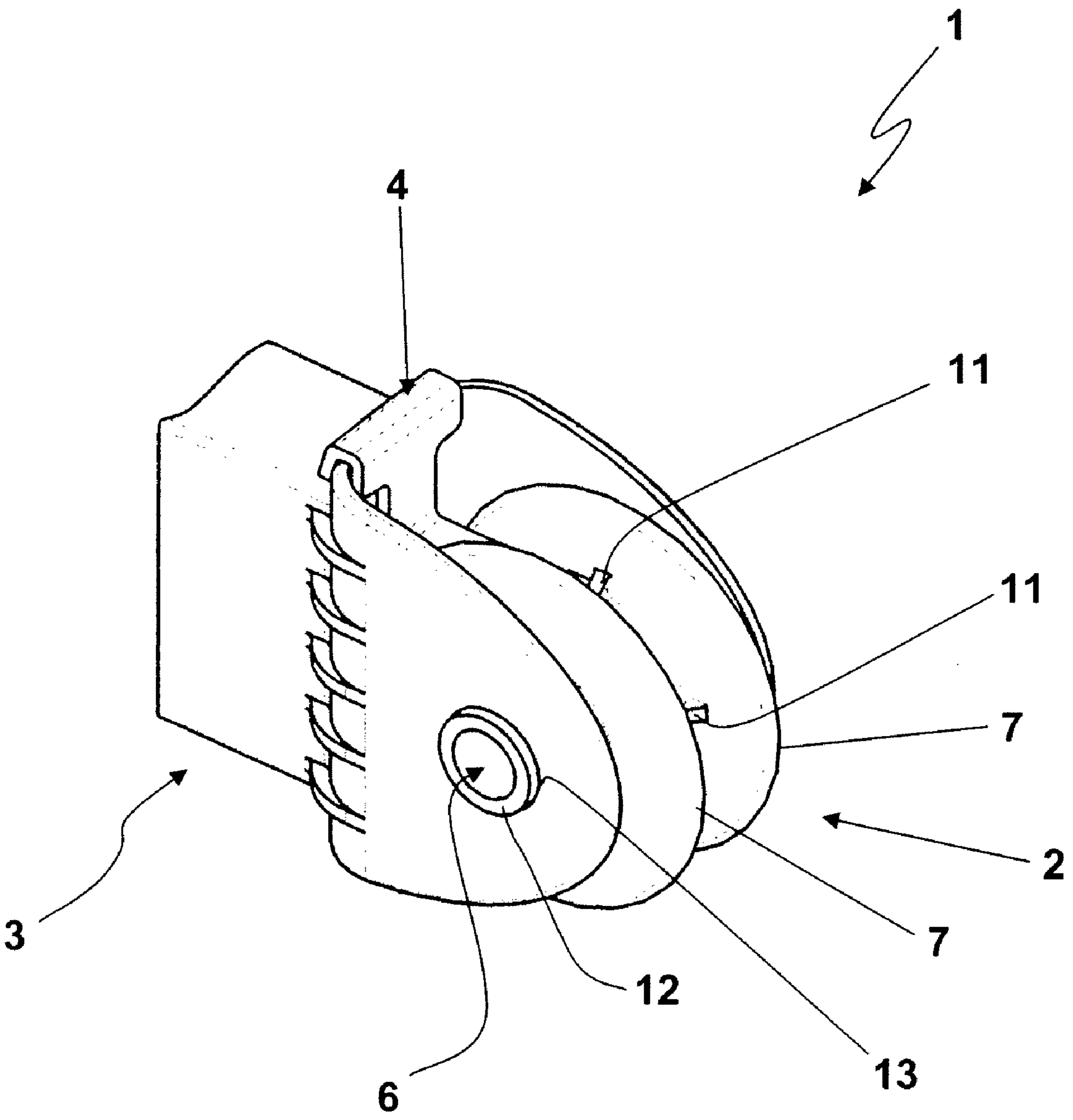
FIG. 2 shows an assembled insulator assembly of the embodiment as shown in FIG. 1.
Figure 3:
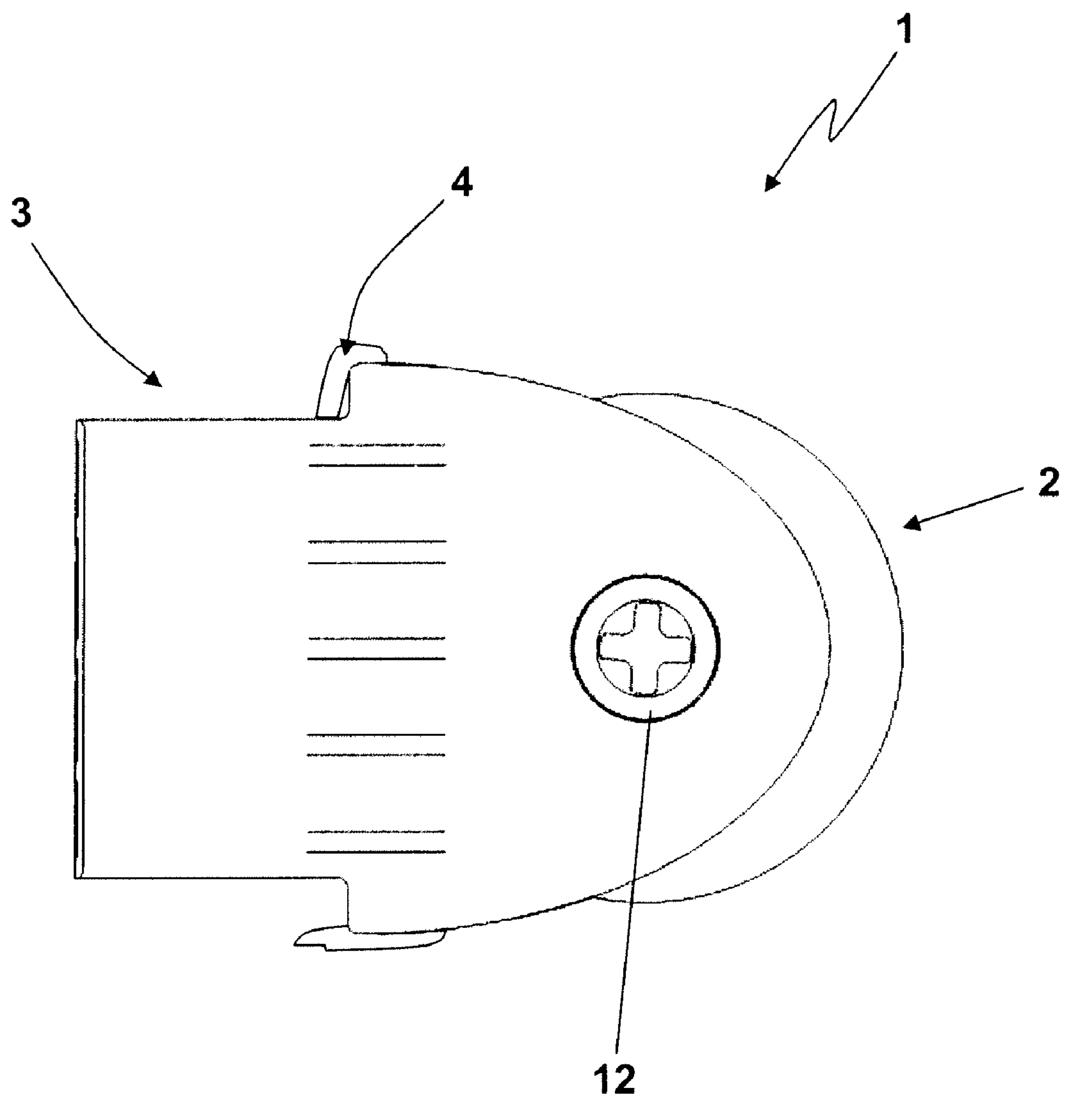
FIG. 3 shows a side elevation of an insulator assembly as shown in FIG. 1.
Figure 4:
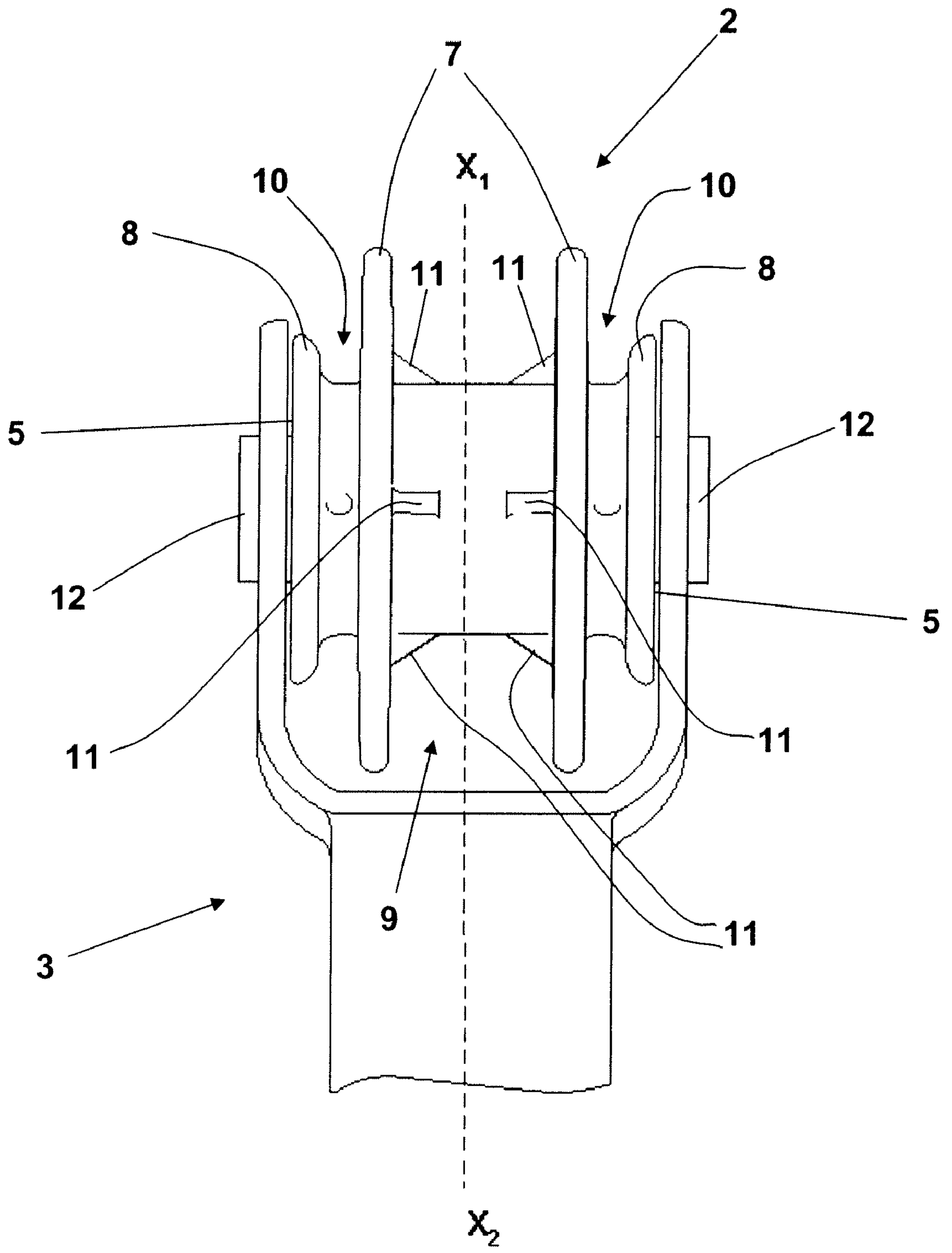
FIG. 4 shows a plan view of an insulator assembly as shown in FIG. 1.
Figure 5:
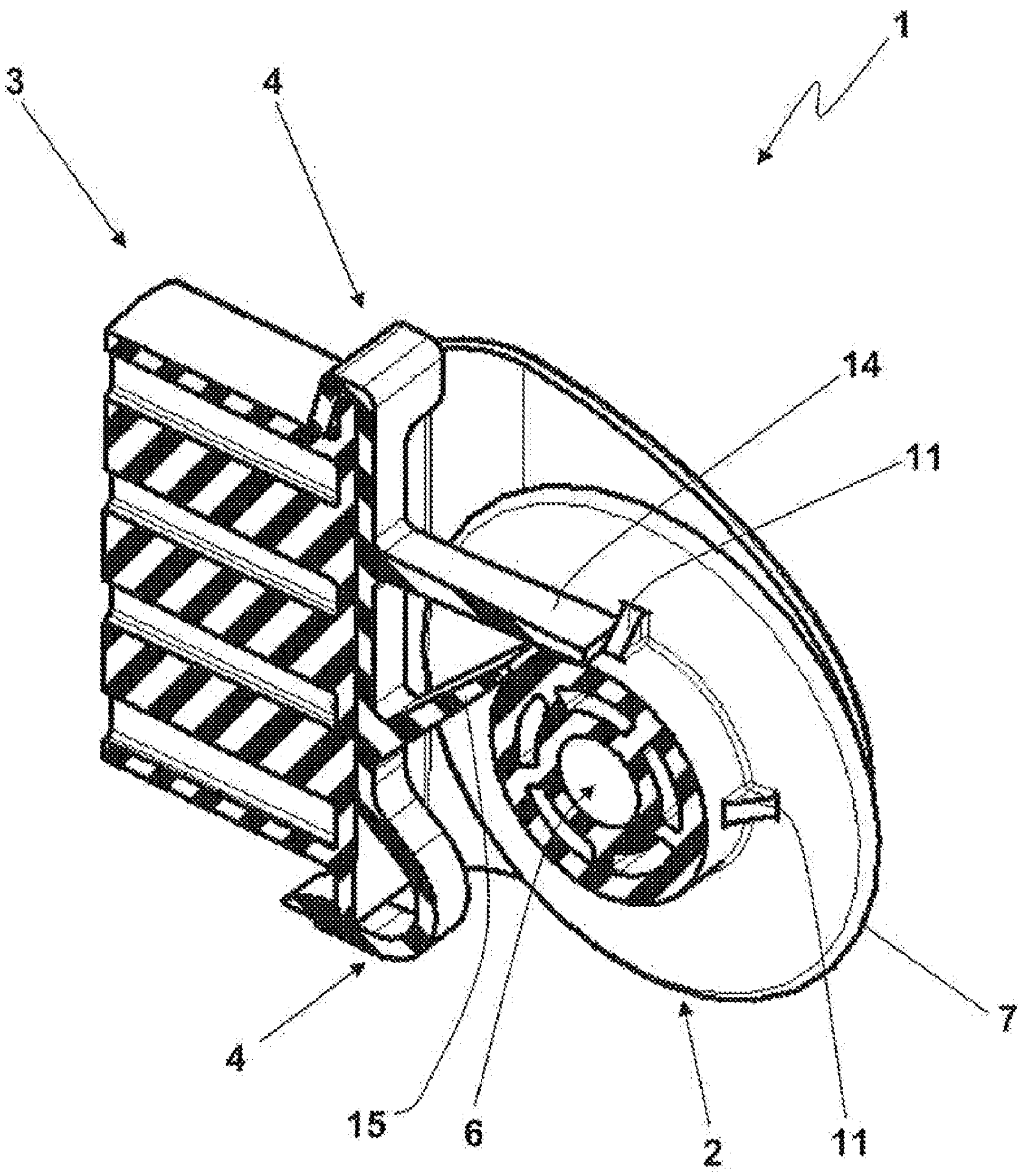
FIG. 5 shows a sectional view through the line $X_1$ $X_2$ of the insulator assembly shown in FIG. 4.

FIGS. 1-5 show a preferred embodiment of an insulator (1) comprised of a non-conductive element in the form of bobbin (2), and insulated bracket (3) and an optional insulated pawl (4).

The bobbin (2) is formed as a substantially disk-shaped element with two substantially opposing circular faces (5) linked by a central aperture (6) located at the geometric centre of both circular faces (5) and extending therebetween, such that the central axis of one circular face is substantially coaxial with that of the other circular face.

The outer curved surface of the bobbin (2), is sub-divided into four annular ridges (7, 8) spaced apart defining three confined pathways in the form of annular troughs (9, 10). The central trough (9) is formed significantly wider than the two outermost troughs (10) and is equipped with a series of ratchet teeth (11) equidistantly arranged about the circular length of said central trough (9). The ridges (7) adjacent the central trough (9), are formed significantly larger than the outer most ridges (8) and the two outermost troughs (10) interposed therebetween are formed substantially narrower than said central trough (9). The central aperture (6) is formed through the bobbin (2), with outwardly projecting cylindrical stubs (12) extending outwards along an axis of rotation co-axial with the central aperture (6) and configured to engage within corresponding apertures (13) on opposing sides of a substantially u-shaped bracket (3). When engaged within said apertures (13), the bobbin (2) is freely rotatable about said axis of rotation.

An optional pawl mechanism (4) may be attached to the bracket (3) about the mid point of said u-shape and includes two elongated resilient extensions (14, 15) configured to engage with the teeth (11) of the bobbin (2) such that rotation about the axis of rotation is only permissible in one direction. It will be seen that as the bobbin (2) is formed from an insulating medium and possesses three distinct pathways, (ie troughs (9, 10)) it is possible to simultaneously pass up to three separate conductive wires/strands around said confined pathways. It will also be appreciated that bobbin (2) configurations with one, two, three, four, or more confined pathways are possible.

It is also possible to form each insulator (1) from two or more separate bobbins (2) arranged side by side about a common axis of rotation. Again, such a configuration may provide any number of confined pathways capable of engaging with a corresponding number of conductive strands The insulator assembly (1) may be utilised to form an electrified fence (100) as shown in any one of FIGS. 6-8. The fence (100) may be formed in a variety of embodiments, although all embodiments incorporate the common feature that one or more continuous strands of conductive material may be used to successively span the region requiring electrified barrier protection.

Figure 6:
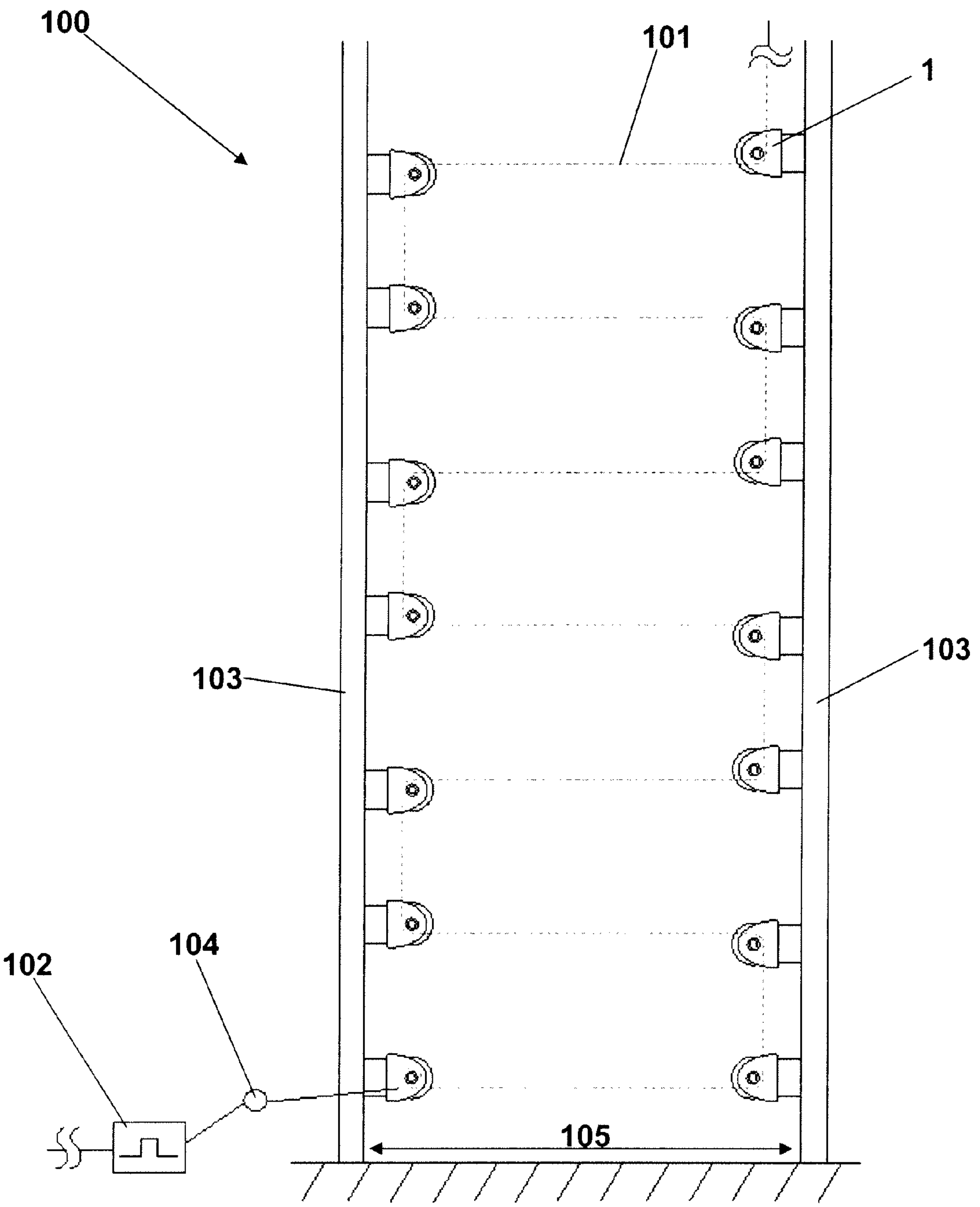
FIG. 6 shows a side elevation of an electric fence formed as a further embodiment of the present invention.

In FIG. 6, a plurality of insulators (1) are used in a first embodiment of an electric fence constructed in accordance with the present invention. It will be appreciated however that alternative insulators may be utilised without falling outside the scope of the invention.

FIG. 6 shows a single conductive strand (101) connected to a power supply (102), said conductive strand (101) being used to form an electric fence between two substantially opposed vertical posts (103) and utilising the above described insulator (1). It will be appreciated however, that the region defined by the electric fence need not necessarily be between two vertically orientated sides and may equally be formed between two horizontal sides and/or a combination of same. The region need not necessarily be a fence in the strict sense of the word, but could be equally applied to gates, doors and so forth.

Conductive strand (101) is attached to an upright post (103) at a convenient point typically located at either the top or bottom of the post (103). The conductive strand (101) is connected to a power supply (102) at a detachable connection point (104) attached to a first insulator (1) and extends directly across the open region requiring electrified barrier protection (105) until reaching an opposing insulator (1) engaging in one of the outer troughs (10) of the bobbin element (2) of the insulator (1).

The strand (101) extends around the outer curved surface of the trough (10) until re-orientated through an angle of substantially 90° vertically upwards, thereupon engaging with a corresponding outer trough (10) of a further insulator (1) located directly above the previous insulator (1). The strand thereupon extends around a similar portion of the trough (10) surface until re-orientated through a further 90° and then traversing back across region (105) in reciprocal direction to the first traverse until encountering a subsequent opposing insulator (1) mounted on the post (103) and engaging again in a outer trough (10) and being realigned vertically upwards until engaging with a further insulator (1) and thereupon returning to again span the said region (105) and engage with a yet further insulator (1).

This process is repeated through successive insulators (1) until terminating in an end fitting (not shown). According to the vertical and horizontal dimensions of the region (105) to be covered, the number of insulators (1) and the length of each strand (101) spanning the region (105) may be correspondingly adjusted. In the preferred embodiment shown, either or both of the initial and/or final insulator fittings may take the form of an insulator (1) with insulator pawl (4) fitted to provide uni-directional ratchet action.

After the conductive strand (101) has been interconnected via insulators (1) as described above, rotating either and/or both of the end fittings to tighten the conductive strand (101) wound about the outer curved surface in trough (10) of each intermediate insulator (1) acts upon the entire length of conductive strand (101), thereby applying tension to the entire fence (101).

In the event any and/or all of insulators (1) are rotatably mounted in said insulated brackets (3), the frictional forces opposing the tensioning action will be correspondingly reduced. By virtue of the single tensioning action, an even and consistent force is applied to all the sections of conductive strand (101) spanning the region (105).

Figure 7:
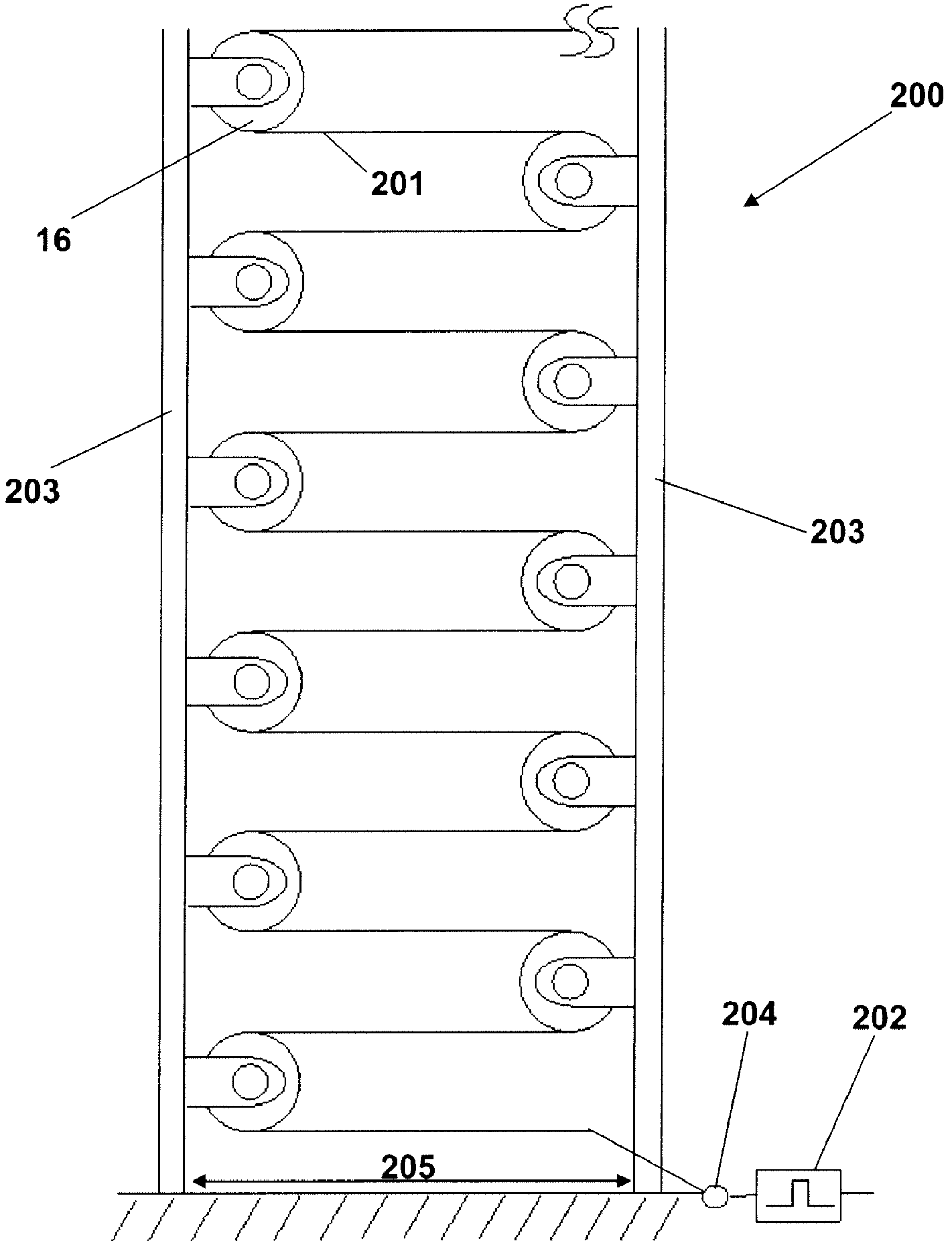
FIG. 7 shows a side elevation of an electric fence formed as a further embodiment of the present invention.

FIG. 7 shows a fence (200) according to an alternative embodiment in which the use of a pair of insulators (1) attached to either post (203) used to realign the orientation of conductive strand (201) through substantially 180° to span the region (205) (as per the previous embodiment described with reference to FIG. 6) is replaced by a single insulator (16) with a significantly increased bobbin diameter. This permits a reduced vertical spacing between sections of strand (201) spanning the region (205). This may be desirable in applications where an extremely fine spacing between strands (201) is required.

Figure 8:
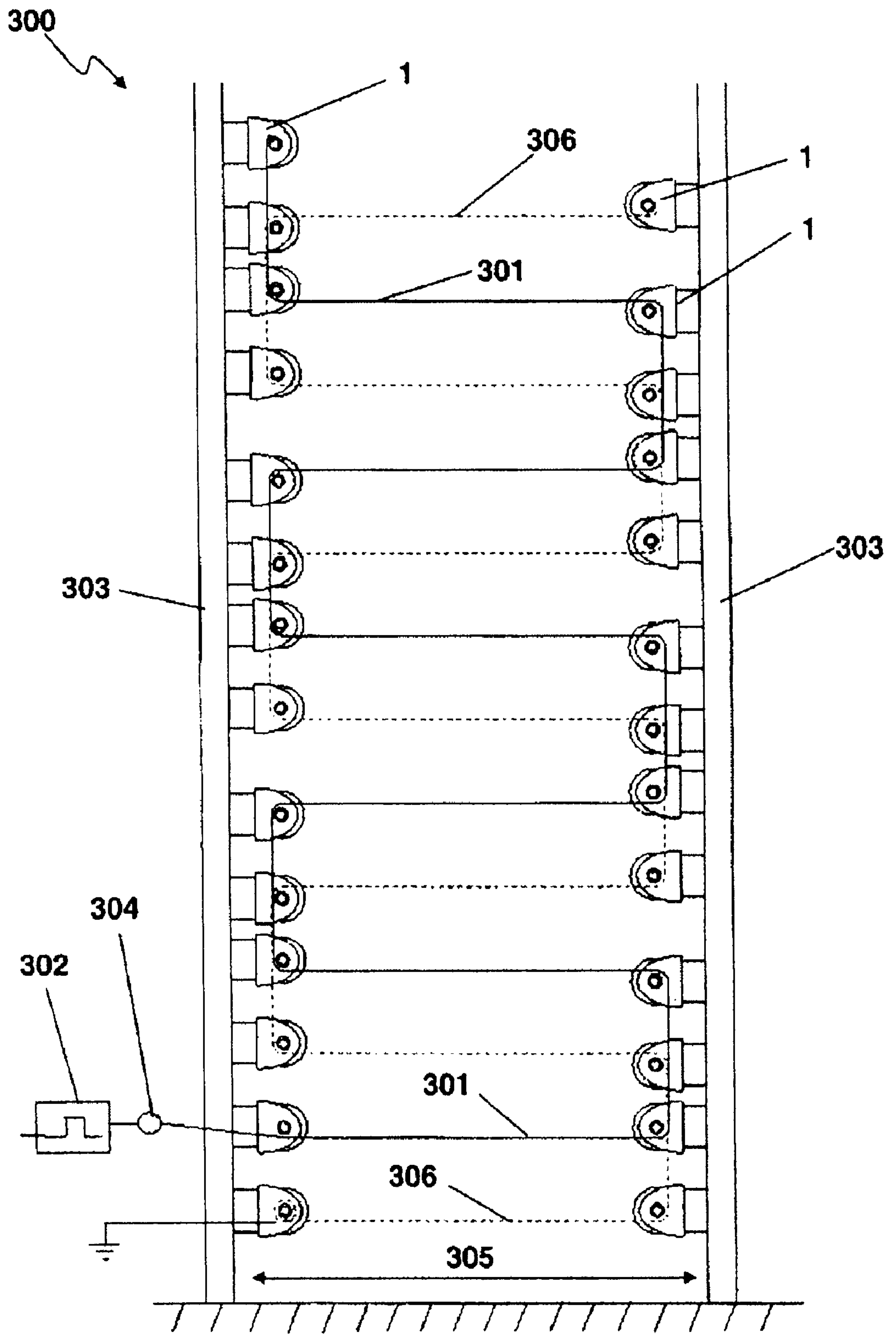
FIG. 8 shows a side elevation of a fence formed as a further embodiment of the present invention.

FIG. 8 shows yet a further embodiment whereby a first conductive strand (101) having a high voltage is interconnected through alternate insulators (1) mounted on post (103), whilst a second strand (106), having a lower voltage than the first strand (101), is interconnected between the remaining insulators (1) in a corresponding manner to the embodiments described with reference to FIGS. 6 and 7.

FIG. 8 shows yet a further embodiment of an electric fence (300) whereby a first conductive strand (301) having a high voltage is interconnected through alternate insulators (1) mounted on post (303), whilst a second strand (306), having a lower voltage than the first strand (301), is interconnected between the remaining insulators (1) in a corresponding manner to the embodiments described with reference to FIGS. 6 and 7. In all embodiments, like elements are similarly numbered in the drawings. The advantage of creating an electric potential difference between the two strands (301, 306) is the prevention of a potential assailant from insulating themselves from the adjacent terrain, (eg by suitably insulated clothing/footwear) by providing a conductive path when the assailant simultaneously touches the high voltage conductive strand (301) and the low voltage conductive strand (306), or from scaling a fence where all the strands being touched are at the same voltage or earthed.

The voltage applied to the separate strands (301, 306) may differ in any number of ways, provided the net result is an electric potential difference between the strands sufficient to shock an assailant touching both strands (301, 306).

The position of the respective strands (301, 306) as they pass around each insulator (1) is shielded from the view of an observer located on either side of the fence (300). It would be unclear to the observer without very careful scrutiny whether a particular strand entering an insulator (1) passes straight through, or is turned through an angle (e.g. 90, 180 degrees).

This uncertainty may be further compounded by utilising an irregular pattern to repeatedly traverse the region (305), and/or alternating the strands (301, 306) in a lateral direction between the opposite sides of the insulators (1), i.e. moving between the two outer troughs (10). Myriad combinations and permutations of fence configuration are possible using the construction method of the invention and will be understood to fall within the scope and spirit of the invention. In both embodiments shown in FIGS. 7 and 8, a single tensioning means (ie by means of an insulated pawl (4) fitted to the first or last insulator (1) assembly) enables the requisite degree of tension to be applied to the entire fence from a single point. It will be apparent to those skilled in the art that any of the aforesaid embodiments may be implemented with the side posts (303) in a substantially horizontally opposed configuration.

It will be apparent to those skilled in the art that any of the aforesaid embodiments may be implemented with the side posts (103) in a substantially horizontally opposed configuration.

Due to the three distinct troughs (9, 10) of bobbin (2) it will be apparent that in fact three electrically distinct conductive strands may be simultaneously used on a given fence and that the same concept could be extended to any number of conductive strands by providing a bobbin (2) with any corresponding number of troughs.

Aspects of the present invention have been described by way of example only and it should be appreciated that modifications and additions may be made thereto without departing from the scope thereof.

What is claimed is:

1. An electric fence comprising:

two substantially opposing supports;

a plurality of insulators coupled to the supports, at least two of the plurality of insulators coupled to each said opposing support, each of said insulators including a substantially non-conductive element having at least two confined pathways, each confined pathway defined by at least two annular ridges and said non-conductive element freely rotatable about a central axis orientated to maintain symmetrical revolution;

a first conductive strand coupled to the insulators and connected to an electrical power source configured to apply an electrical current to said first conductive strand;

a second conductive strand coupled to the insulators, the second conductive strand electrically distinct to said first conductive strand to have a voltage potential therebetween to generate an electrical barrier between said opposed supports, wherein said first and second conductive strands extend continuously and repeatedly between each said opposing support such that only one of said first or second conductive strands pass through any one of said confined pathways of each of said insulators, and both said first and second conductive strands pass through a respective one of the confined pathways of at least one of said insulators, wherein each said annular ridge is of a height sufficient to shield a length of each said conductive strand passing through said confined pathways such that an observer cannot readily determine whether a particular one of said conductive strands entering one of said confined passages passes straight through, or is turned through an angle.

2. The fence as claimed in claim 1, wherein the voltage potential between the at least two conductive strands is a difference in at least one of: a voltage phase, a voltage magnitude, and a voltage polarity.

3. The fence as claimed in claim 1, wherein each said confined pathway is formed as at least one of: a groove, a channel, a notch, a passageway, and an aperture.

4. The fence as claimed in claim 1 wherein said non-conductive element is substantially disk-shaped.

5. The fence as claimed in claim 4, wherein said non-conductive element includes two substantially opposing circular faces, wherein the central axis of one of said circular faces is substantially co-axial with that of the other circular face.

6. The fence as claimed in claim 1, wherein one end of each conductive strand is fixedly mounted at a detachable connection point, and wherein at least one of the plurality of insulators is coupled to a second opposite end of each said conductive strand includes a tensioning mechanism.

7. The fence as claimed in claim 6, wherein said tensioning mechanism includes a non-conductive rotatable element configured to only permit unidirectional rotation.

8. The fence as claimed in claim 7, wherein said unidirectional rotation of said rotatable element is controlled by a series of ratchet teeth and a pawl.

9. The fence as claimed in claim 8, wherein at least one of said confined pathways contains said ratchet teeth.

10. The fence as claimed in claim 9, wherein said rotatable element is rotatably attached to a non-conductive bracket.

11. The fence as claimed in claim 10, wherein said pawl is releasably attached to said non-conductive bracket.

12. The fence as claimed in claim 6, wherein said fence is tensioned by winding said conductive strands about the outside of said non-conductive element by said unidirectional rotation.

13. The fence as claimed in claim 1, wherein the second conductive strand is electrically connected to ground.

14. The fence as claimed in claim 1, wherein the central axis is orientated along a horizontal direction.

15. An electric fence comprising:

two substantially opposing supports;

a plurality of insulators coupled to the supports, at least two of the plurality of insulators coupled to each said opposing support, said insulators including a substantially non-conductive element having at least two confined pathways, said non-conductive element freely rotatable about a central axis orientated to maintain symmetrical revolution;

a first conductive strand coupled to the insulators and connected to an electrical power source configured to apply an electrical current to first strand;

a second conductive strand coupled to the insulators, the second conductive strand electrically distinct to said first conductive strand to have a voltage potential therebetween to generate an electrical barrier between said opposed supports, wherein said first and second conductive strands extend continuously and repeatedly between each said opposing support such that each only one of said first or second conductive strands pass through any one of said confined pathways of each of said insulators, wherein one end of each conductive strand is fixedly mounted at a detachable connection point, and wherein at least one of the plurality of insulators is coupled to a second opposite end of each conductive strand and includes a tensioning mechanism.

* * * * *